United States Patent
Hanebutte et al.

(10) Patent No.: US 12,112,175 B1
(45) Date of Patent: Oct. 8, 2024

(54) METHOD AND APPARATUS FOR PERFORMING MACHINE LEARNING OPERATIONS IN PARALLEL ON MACHINE LEARNING HARDWARE

(71) Applicant: Marvell Asia Pte Ltd, Singapore (SG)

(72) Inventors: Ulf Hanebutte, Gig Harbor, WA (US); Avinash Sodani, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 134 days.

(21) Appl. No.: 17/590,994

(22) Filed: Feb. 2, 2022

Related U.S. Application Data

(63) Continuation-in-part of application No. 17/511,111, filed on Oct. 26, 2021, and a continuation-in-part of (Continued)

(51) Int. Cl.
*G06F 8/41* (2018.01)
*G06F 9/30* (2018.01)
(Continued)

(52) U.S. Cl.
CPC ............ *G06F 9/3879* (2013.01); *G06F 8/453* (2013.01); *G06F 9/30174* (2013.01);
(Continued)

(58) Field of Classification Search
None
See application file for complete search history.

(56) References Cited

U.S. PATENT DOCUMENTS 4,982,291 A    1/1991 Kurahashi et al.
5,329,611 A *  7/1994 Pechanek ................. G06N 3/10
                                              706/42

(Continued)

FOREIGN PATENT DOCUMENTS

GB          2604142 A  *  8/2022
KR       20210052188 A      5/2021
(Continued)

OTHER PUBLICATIONS

Ceze, L., et al. Colorama: Architectural Support for Data-Centric Synchronization, 2007, IEEE, pp. 134-144 (Year: 2007).
(Continued)

*Primary Examiner* — Philip Wang (57) ABSTRACT

A method includes receiving a set of data. The set of data is divided into a plurality of data portions. The method includes transmitting the plurality of data portions to a plurality of processing tiles, wherein each data portion of the plurality of data portions is associated with a processing tile of a plurality of tiles. Each processing tile of the plurality of tiles performs at least one local operation on its respective data portion to form a local result. The method includes exchanging local results between the plurality of processing tiles. Moreover, the method includes calculating a global value based on the local results. The method further includes performing at least one local operation by each processing tile of the plurality of tiles on its respective data portion based on the global value to form a computed result.

15 Claims, 5 Drawing Sheets

Related U.S. Application Data application No. 17/248,045, filed on Jan. 6, 2021, which is a continuation of application No. 16/226,508, filed on Dec. 19, 2018, now Pat. No. 11,086,633.

(60) Provisional application No. 63/282,557, filed on Nov. 23, 2021, provisional application No. 63/105,861, filed on Oct. 26, 2020, provisional application No. 62/675,076, filed on May 22, 2018, provisional application No. 62/644,352, filed on Mar. 16, 2018, provisional application No. 62/628,130, filed on Feb. 8, 2018.

(51) Int. Cl.
| | | |
|---|---|---|
| *G06F 9/38* | (2018.01) | |
| *G06F 15/78* | (2006.01) | |
| *G06F 17/16* | (2006.01) | |
| *G06N 20/00* | (2019.01) | |
| *G06N 20/10* | (2019.01) | |
| *G06F 15/80* | (2006.01) | |
| *G06N 5/04* | (2023.01) | |
| *G06N 20/20* | (2019.01) | |

(52) U.S. Cl.
CPC .......... *G06F 9/3836* (2013.01); *G06F 9/3851* (2013.01); *G06F 9/3877* (2013.01); *G06F 15/7807* (2013.01); *G06F 17/16* (2013.01); *G06N 20/00* (2019.01); *G06N 20/10* (2019.01); *G06F 9/3001* (2013.01); *G06F 15/7864* (2013.01); *G06F 15/8023* (2013.01); *G06F 2212/602* (2013.01); *G06N 5/04* (2013.01); *G06N 20/20* (2019.01)

(56) References Cited

U.S. PATENT DOCUMENTS

| | | | |
|---|---|---|---|
| 5,481,487 A | 1/1996 | Jang et al. | |
| 5,948,098 A | 9/1999 | Leung et al. | |
| 6,415,377 B1 | 7/2002 | Wolf et al. | |
| 6,640,262 B1 | 10/2003 | Uppunda et al. | |
| 7,089,380 B1 | 8/2006 | Schober | |
| 7,191,163 B2 | 3/2007 | Herrera et al. | |
| 7,394,288 B1 | 7/2008 | Agarwal | |
| 7,509,363 B2 | 3/2009 | Clifton | |
| 7,809,663 B1 | 10/2010 | Birch et al. | |
| 7,840,914 B1* | 11/2010 | Agarwal | G06F 8/451 716/102 |
| 7,853,752 B1 | 12/2010 | Agarwal et al. | |
| 7,912,883 B2 | 3/2011 | Hussain | |
| 8,200,728 B2 | 6/2012 | Michaels et al. | |
| 8,209,703 B2 | 6/2012 | Yee et al. | |
| 8,738,860 B1* | 5/2014 | Griffin | G06F 12/0897 711/122 |
| 9,954,771 B1 | 4/2018 | Levy et al. | |
| 10,161,786 B2 | 12/2018 | Chang et al. | |
| 10,296,556 B2 | 5/2019 | Zhou | |
| 10,305,766 B1 | 5/2019 | Zhang et al. | |
| 10,884,736 B1* | 1/2021 | Farooqui | G06F 9/30141 |
| 11,016,801 B1 | 5/2021 | Sodani et al. | |
| 11,604,799 B1 | 3/2023 | Bigdelu et al. | |
| 2003/0163671 A1 | 8/2003 | Gschwind et al. | |
| 2004/0153501 A1 | 8/2004 | Yamashita et al. | |
| 2007/0122347 A1 | 5/2007 | Statnikov et al. | |
| 2008/0040577 A1 | 2/2008 | Nemirovsky et al. | |
| 2009/0097480 A1 | 4/2009 | Curtis et al. | |
| 2009/0158005 A1 | 6/2009 | Carmichael | |
| 2010/0017420 A1* | 1/2010 | Archer | G06F 15/17337 707/E17.009 |
| 2011/0238963 A1 | 9/2011 | Kim et al. | |
| 2011/0307890 A1 | 12/2011 | Achilles et al. | |
| 2013/0101035 A1* | 4/2013 | Wang | H04N 19/174 375/E7.243 |
| 2013/0117521 A1 | 5/2013 | Li et al. | |
| 2014/0007098 A1 | 1/2014 | Stillwell, Jr. et al. | |
| 2015/0019836 A1 | 1/2015 | Anderson et al. | |
| 2015/0046753 A1 | 2/2015 | Cecka et al. | |
| 2015/0106568 A1 | 4/2015 | Feldman et al. | |
| 2015/0309808 A1 | 10/2015 | Nandy et al. | |
| 2015/0347012 A1 | 12/2015 | Dewitt et al. | |
| 2016/0132272 A1* | 5/2016 | Iwashita | G06F 8/453 711/114 |
| 2016/0162402 A1 | 6/2016 | Woolley, Jr. et al. | |
| 2016/0170916 A1 | 6/2016 | Deshpande et al. | |
| 2017/0068571 A1 | 3/2017 | Lu et al. | |
| 2017/0083313 A1 | 3/2017 | Sankaralingam et al. | |
| 2017/0353397 A1 | 12/2017 | Che | |
| 2017/0357483 A1 | 12/2017 | Nicol et al. | |
| 2017/0364694 A1 | 12/2017 | Jacob et al. | |
| 2018/0047126 A1 | 2/2018 | Falkenstern et al. | |
| 2018/0068019 A1 | 3/2018 | Novikoff et al. | |
| 2018/0300617 A1 | 10/2018 | McBride et al. | |
| 2018/0341484 A1 | 11/2018 | Fowers et al. | |
| 2018/0349388 A1* | 12/2018 | Skiles | G06F 16/358 |
| 2019/0121641 A1 | 4/2019 | Knowles et al. | |
| 2019/0121679 A1* | 4/2019 | Wilkinson | G06F 9/3009 |
| 2019/0146455 A1 | 5/2019 | Beylkin et al. | |
| 2019/0147471 A1 | 5/2019 | McKelvey, Jr. et al. | |
| 2019/0138210 A1 | 11/2019 | Lindholm | |
| 2021/0158155 A1* | 5/2021 | Zhang | G06N 3/048 |
| 2021/0216874 A1* | 7/2021 | Jegou | G06N 3/08 |
| 2021/0319317 A1* | 10/2021 | Power | G06N 3/063 |
| 2021/0390076 A1 | 12/2021 | Fang et al. | |
| 2022/0067513 A1* | 3/2022 | Stevens | G06N 3/045 |
| 2022/0076110 A1* | 3/2022 | Shao | G06F 9/3001 |
| 2022/0207783 A1* | 6/2022 | Kwong | G01F 1/66 |
| 2022/0261650 A1* | 8/2022 | Zhao | G06N 3/084 |
| 2022/0405566 A1* | 12/2022 | Winterbottom | G02B 6/30 |
| 2023/0024035 A1* | 1/2023 | Thuerck | G06F 15/8046 |
| 2023/0071931 A1 | 3/2023 | Huang et al. | |
| 2023/0106651 A1* | 4/2023 | Xi | G06F 7/49942 708/277 |
| 2023/0252275 A1* | 8/2023 | Nez | G06N 3/063 706/41 |

FOREIGN PATENT DOCUMENTS

| | | |
|---|---|---|
| WO | 0245385 A2 | 6/2002 |
| WO | 2018222904 A1 | 12/2018 |

OTHER PUBLICATIONS

Brewer, "Instructions Set Innovations for the Convey HC-1 Computer", 2010, pp. 70-79, Year: 2010.

Seng, et al. "Reducing Power with Dynamic Critical Path Information", Jan. 1999, pp. 114-123; Year: 1999.

Gelado, et al., "An Asymmetric Distributed Shared Memory Model for Heterogeneous Parallel Systems", 2010 (Year: 2010) 12 pages.

\* cited by examiner

METHOD AND APPARATUS FOR PERFORMING MACHINE LEARNING OPERATIONS IN PARALLEL ON MACHINE LEARNING HARDWARE

CROSS-REFERENCE TO RELATED APPLICATIONS

This application is a nonprovisional application and claims the benefit and priority to the U.S. Provisional Patent Application No. 63/282,557, that was filed on Nov. 23, 2021, which is incorporated herein by references in its entirety.

This application is a continuation in part application and claims the benefit and priority to the U.S. patent application Ser. No. 17/511,111, that was filed on Oct. 26, 2021. The U.S. patent application Ser. No. 17/511,111 claims the benefit and priority to U.S. Provisional Patent Application No. 63/105,861, filed Oct. 26, 2020, and entitled "METHOD AND APPARATUS FOR PERFORMING ARGMAX OPERATIONS IN PARALLEL ON MACHINE LEARNING HARDWARE," which is incorporated herein in its entirety by reference.

This application is also a continuation-in-part patent application and claims the benefit and priority to U.S. patent application Ser. No. 17/248,045, filed Jan. 6, 2021, entitled "INSTRUCTION SET ARCHITECTURE (ISA) FORMAT FOR MULTIPLE INSTRUCTION SET ARCHITECTURES IN MACHINE LEARNING INFERENCE ENGINE," which is a continuation application of U.S. patent application Ser. No. 16/226,508, filed Dec. 19, 2018, which claims the benefit and priority to U.S. Provisional Patent Application No. 62/628,130 filed on Feb. 8, 2018, U.S. Provisional Patent Application No. 62/644,352 filed on Mar. 16, 2018, and U.S. Provisional Patent Application No. 62/675,076 filed on May 22, 2018, all of which are incorporated herein by reference in their entirety.

BACKGROUND

Electronic devices have become an integral part of daily life. Many electronic applications perform various operations such as TopK operation, ArgMax operation, SoftMax operation, etc., on an input data, e.g., a vector, in order to make a certain determinations. For example, in one particular application in machine learning (ML), a TopK operation is used to identify the top K indices or entries with the highest probabilities among a large set of data entries, e.g., classifying an image among thousands of classes. TopK operation has also become a common operator in other applications, such as ad-hoc search and retrieval in relational databases, documents, and multimedia databases, etc. A special case of TopK operation is the ArgMax operation, in which K is set equal to one, to identify the largest data value and its index. To perform an ArgMax operation, elements in a vector are compared to one another to identify the largest value and the index location associated with the largest value.

In general, a SoftMax operation operates on an input data, e.g., data associated with an image, translation term, etc., normalizes the input data into a probability distribution with respective probability values. For example, the SoftMax operation may be performed on an image of a cat, to determine the likelihood that the image is a subject of interest, e.g., a cat as opposed to a dolphin, a dog, a pole, etc. In another example, SoftMax operation has become even more important in light of recent developments in ML, e.g., self-driving vehicles to identify objects, language translation to determine the meaning of the term, etc. The probability distribution can be used in a self-driving application to identify the likelihood that the object is a person as opposed to a pole, etc., whereas in translation applications the SoftMax operation is used to determine the correct translation of a term as an example.

The amount of data being processed has increased substantially in recent years, given the increase in ML applications as well as the increase in the amount of data being exchanged. Unfortunately, conventional systems utilize a single processor (element) to process large amount of data, resulting in large delays and slower processing speed for various ML operations such as SoftMax, ArgMax operation, etc. For example, some conventional systems gather distributed data onto a single processing element in order to perform the desired operation, e.g., SoftMax operation, sequentially, which is time consuming and unsuitable for many applications, e.g., self-driving vehicles. Moreover, using a single processing element usually results in the local memory, e.g., static random access memory (SRAM), being inadequate to perform the operations without a need to utilize the external double data rate (DDR) memory, which results in additional data transfer latencies.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen to perform certain ML operations, e.g., SoftMax, ArgMax, TopK, etc., on an ML hardware with a plurality of processing tiles that enables data to be processed in a much faster fashion in comparison to the sequential processing of a single processing element, thereby improving the processing speed. Leveraging multiple processing tiles addresses inadequacies associated with data movement between local memory, e.g., SRAM, and external memory such as DDR because a large data set is broken down to smaller data sets, which can be processed by each processing tile locally without a need to access the external memory once the data is stored locally.

Specifically, the core is configured to divide the plurality of ML commands between the core, e.g., host or host CPU, and the inference engine for efficient execution thereof. The ML commands, e.g., SoftMax, TopK, ArgMax, etc., are compiled by the compiler into ISA instructions and the relevant data associated with the ISA instructions are transmitted for execution to the inference engine from the core and the memory to the instruction-streaming engine and the data streaming engine for efficient streaming to the inference engine. The data and instruction steaming engines are configured to send one or more data streams, e.g., data sub-vectors to be operated on by the plurality of processing elements, and ML commands that are compiled, e.g., ISA instructions corresponding to SoftMax, TopK or ArgMax, to the inference engine in response to the received programming instructions from the core.

It is appreciated that, in some embodiments, the ML commands being transmitted from the core to the data/instruction-streaming engines is in a function call format, therefore enabling different processors with different instruction set architectures to be programmed using one type of instruction set architecture. To the core, the operation being performed is a write operation into a memory component, but in reality the operation being done is passing on specific instructions along with their associated data via a function call to the streaming engines for transmission to the inference engine where they can be executed. The inference engine is configured to process the instruction/data streams received from the data/instruction stream engines for the ML operation according to the programming instructions received from the instruction/data streaming engines.

For a non-limiting example, the inference engine may include 64 processing elements (each processing element may further include a plurality of smaller processing elements PE and POD that are described in the U.S. patent application Ser. No. 16/226,508, filed Dec. 19, 2018 that is incorporated herein by reference in its entirety). Each of those processing elements is configured to receive a sub-vector and an instruction (i.e., compiled SoftMax instructions, ArgMax instruction, etc.). As such, multiple sub-vectors may be operated on simultaneously, thereby reducing the processing time. For illustrative purposes, it is assumed that there are 64 processing elements (also referred to as processing tiles) where each processing element is configured to process 64 elements with a depth of 10 (i.e., 10 vectors). However, it is appreciated that any number of processing tiles, each being capable of processing any number of elements such as 32 as opposed to 64 with a different depth such as 5. In some examples, 4 processing elements may receive a sub-vector (each 32 elements as an example) to process an ArgMax operation on a vector data of size 128 elements in parallel while the other 60 processing elements of the inference engine may operate on a different vector or perform a different ML operation altogether. Accordingly, the index associated with the vector with the largest value can be identified.

The proposed ML hardware architecture is highly efficient, flexible and optimized for high-efficiency ML computing while programmable to adapt to the changing environment, usage, applications and algorithms for ML with reduced overhead. By providing hardware support to streamline data/instruction flow, the proposed ML hardware architecture improves system-level performance by significantly reducing the hardware overhead involved in moving data and/or instruction in existing computing architectures. Moreover, the programming instruction set reduces the number of instructions required to perform certain tasks, e.g., processing, moving data, loading data, etc. The proposed ML hardware architecture works well with existing software frameworks and code and may be applied to a wide variety of ML algorithms and neural networks including but not limited to convolution neural network (CNN), recurrent neural network (RNN), gradient boosting machine (GBM), generative adversarial neural network, decision trees, random forest, support vector machine (SVM), clustering, Markov random field (MRF), etc.

A SoftMax operation when compiled is generally broken down into sub-operations or tasks. For example, a SoftMax operation generally involves identifying the maximum value within a given vector. The maximum value is then subtracted from each element of the vector and an exponential of the result is formed to form exponential values. The exponential results are summed and the result is inverted to form an inverted value. Finally, the exponential values are multiplied by the inverted value. Various steps in SoftMax operation is summarized below:

Finding maximum value of a vector;
Subtract the maximum value from each element of the vector to form a subtracted value;
Perform an exponential operation on each subtracted value to form exponential values;
Perform a sum on the exponential values;
Invert the sum to form a scaled value; and
Multiply each exponential value by the scaled value.

Performing the SoftMax operation on an ML hardware with multiple processing tiles is challenging. For example, if a vector is divided into a plurality of sub-vectors then identifying the largest or maximum value may need certain data to be exchanged between the processing tiles. Other operations of the SoftMax operation may similarly need certain information to be exchanged between the processing tiles. It is appreciated that generally latency increases as the amount of data exchange between processing tiles increases. As such, performing the operations for the SoftMax operation in an efficient manner utilizing the architecture of the ML hardware is critical.

The proposed approach performs the SoftMax operation in an efficient manner while leveraging the architecture of the ML hardware with multiple processing tiles to increase processing speed and reducing latencies associated with data movement. The architecture of ML hardware is described first before describing the proposed approach to perform an ML operation such as SoftMax operation.

Figure 1:
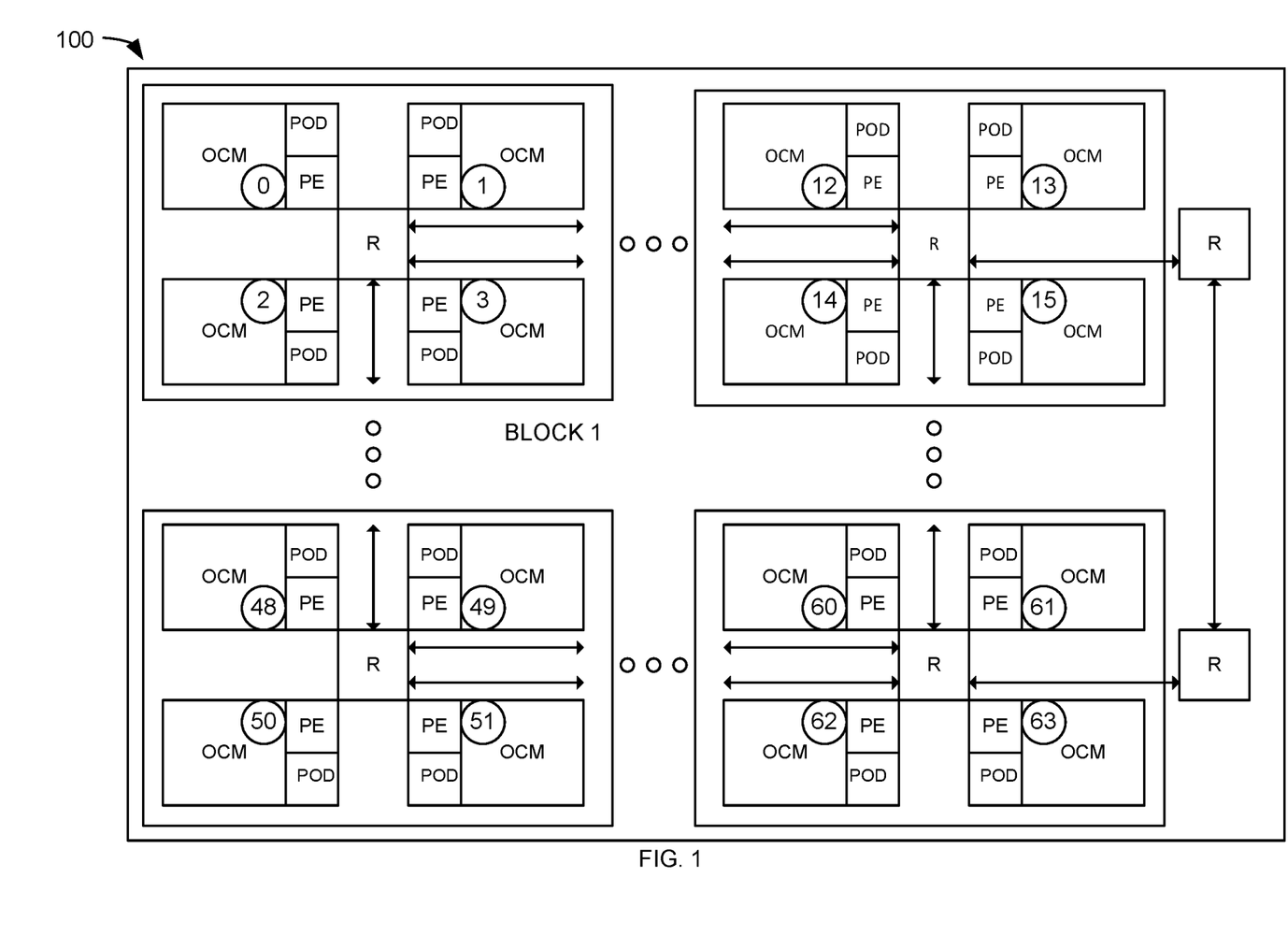
FIG. 1 depicts a non-limiting example of an inference engine that includes a plurality of processing tiles arranged in a two-dimensional array of a plurality of rows and columns according to one aspect of the present embodiments.

In the example of FIG. 1, the ML-specific hardware 100 is a dedicated hardware including one or more microprocessors and/or on-chip memory (OCM) units storing the data and/or the set of low-level instructions compiled from the high-level code by the compiler to perform one or more ML operations, e.g., SoftMax operation, ArgMax operation, TopK operation, scatter-gather operation, etc. At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be but is not limited to an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (POD), and a second type of processing unit (PE). Both types of processing units can execute and be programmed by some of the plurality of low-level instructions received from the compiler. In some embodiments, a plurality of processing tiles forms a processing block, e.g., tiles 0-3 forms processing block 1 and the processing tiles within each processing block are coupled to one another via a routing element, e.g., tiles 0-3 are coupled to one another via routing element R to form processing block 1. It is appreciated that the ML-specific hardware 100 is provided for illustrative purposes and should not be construed as limiting the scope of the embodiments.

Figure 2:
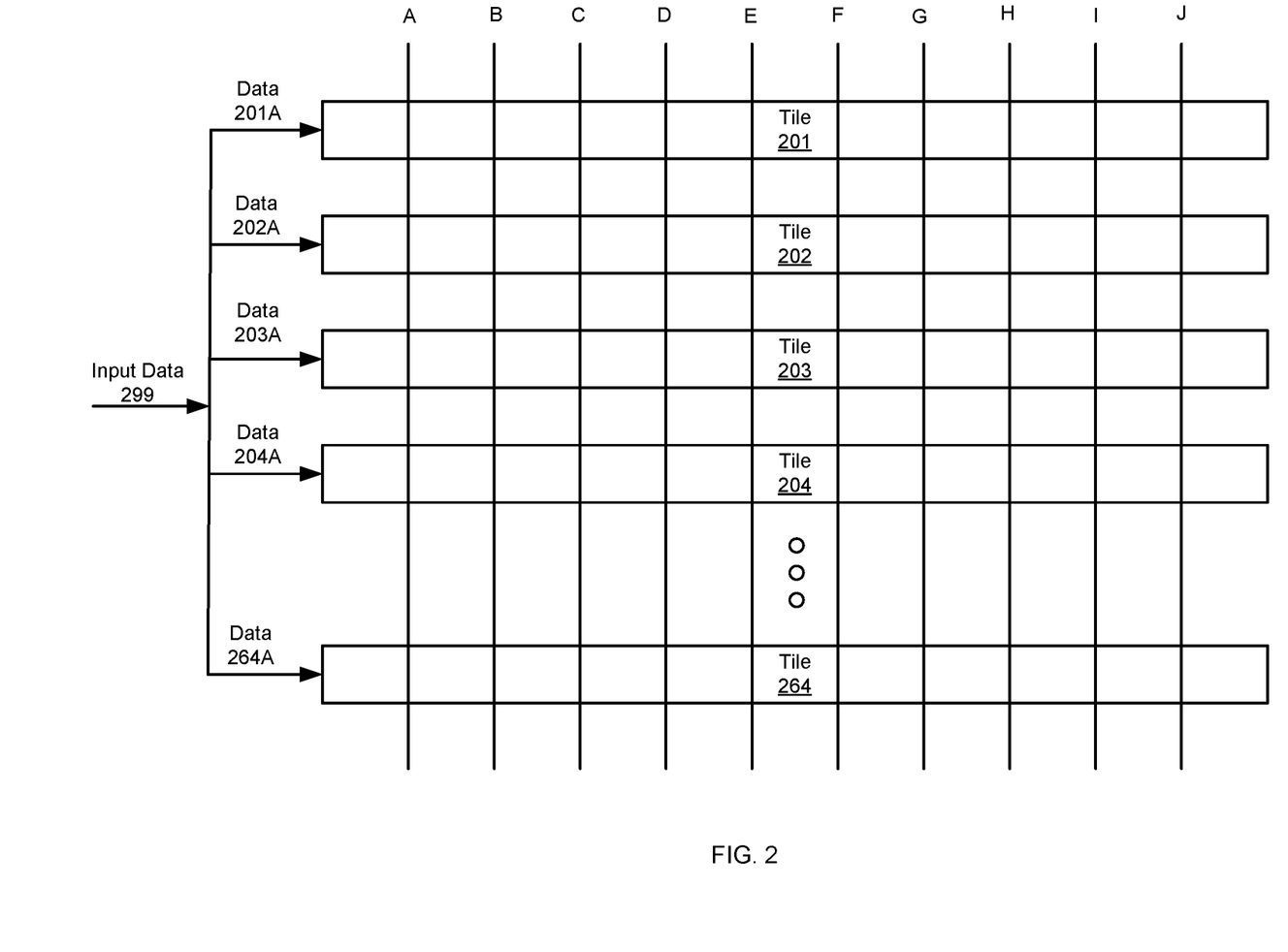
FIG. 2 depicts an ML hardware performing a SoftMax operation according to one aspect of the present embodiments.

FIG. 2 depicts an ML hardware performing a SoftMax operation according to one aspect of the present embodiments. The ML hardware as depicted here is similar to that of FIG. 1, described above. In this nonlimiting example, the ML hardware includes 64 processing tiles, tiles 201, 202, 203, 204, . . . , 264. Each processing tile may include various components, e.g., POD, PE, OCM, etc., as described in FIG. 1. For illustrative purposes, each processing tile in this nonlimiting example is presumed to be capable of processing 64 elements and 10 vectors, i.e., depth of 10, simultaneously. However, it is appreciated that the number of elements and vectors that are being processed is for illustrative purposes and should not be construed as limiting the scope of the embodiments.

The ML hardware in this nonlimiting example receives an input data 299. For illustration purposes the input data 299 is presumed to be (4096,10). The input data 299 may be represented as a data matrix as shown below:

$$\text{Input Data} = \begin{bmatrix} a1 & \cdots & j1 \\ \vdots & \ddots & \vdots \\ a4096 & \cdots & j4096 \end{bmatrix}.$$

In other words, the input data 299 includes 10 vectors, each vector having 4096 elements. In some examples the vector $A=(a_1, \ldots, a_{4096})$ may be associated with a first image, while vector $B=(b_1, \ldots, b_{4096})$ which is the second column of the input data 299 may be associated with a second image. It is appreciated that vector $C=(c_1, \ldots, c_{4096})$ is the third column of the input data 299 and associated with a third image, vector $C=(c_1, \ldots, c_{4096})$ is the third column of the input data 299 and associated with a third image, vector $D=(d_1, \ldots, d_{4096})$ is the fourth column of the input data 299 and associated with a fourth image, vector $E=(e_1, \ldots, e_{4096})$ is the fifth column of the input data 299 and associated with a fifth image, vector $F=(f_1, \ldots, f_{4096})$ is the sixth column of the input data 299 and associated with a sixth image, vector $G=(g_1, \ldots, g_{4096})$ is the seventh column of the input data 299 and associated with a seventh image, vector $H=(h_1, \ldots, h_{4096})$ is the eighth column of the input data 299 and associated with an eighth image, vector $I=(i_1, \ldots, i_{4096})$ is the ninth column of the input data 299 and associated with a ninth image, and vector $J=(j_1, \ldots, j_{4096})$ is the tenth column of the input data 299 and associated with a tenth image.

Since each vector includes 4096 elements, no one processing tile can process the entire vector alone (because each processing tile is capable of processing 64 elements) unless it is processed sequentially, which is inefficient, slow and suffers from unnecessary latency.

Accordingly, the input data 299 may be divided into smaller portions. For example, vector $A=(a_1, \ldots, a_{4096})$ may be divided into 64 portions each with 64 elements. In other words, vector $A=(A_1, A_2, \ldots, A_{64})$ where $A_1=(a_1, \ldots, a_{64})$, $A_2=(a_{65}, \ldots, a_{128})$, $A_3=(a_{129}, \ldots, a_{192})$, etc. Similarly vector $B=(b_1, \ldots, b_{4096})$ may be divided into 64 portions each with 64 elements. In other words, vector $B=(B_1, B_2, \ldots, B_{64})$ where $B_1=(b_1, \ldots, b_{64})$, $B_2=(b_{65}, \ldots, b_{128})$, $B_3=(b_{129}, \ldots, b_{192})$, etc. Similarly other vectors of the input data 299 are divided into smaller portions. For example, vector $C=(C_1, C_2, \ldots, C_{64})$ where $C_1=(c_1, \ldots, c_{64})$, $C_2=(c_{65}, \ldots, c_{128})$, $C_3=(C_{129}, \ldots, c_{192})$, etc., vector $D=(D_1, D_2, \ldots, D_{64})$ where $D_1=(d_1, \ldots, d_{64})$, $D_2=(d_{65}, \ldots, d_{128})$, $D_3=(d_{129}, \ldots, d_{192})$, etc., vector $E=(E_1, E_2, \ldots, E_{64})$ where $E_1=(e_1, \ldots, e_{64})$, $E_2=(e_{65}, \ldots, e_{128})$, $E_3=(e_{129}, \ldots, e_{192})$, etc., vector $F=(F_1, F_2, \ldots, F_{64})$ where $F_1=(f_1, \ldots, f_{64})$, $F_2=(f_{65}, \ldots, f_{128})$, $F_3=(f_{129}, \ldots, f_{192})$, etc., vector $G=(G_1, G_2, \ldots, G_{64})$ where $G_1=(g_1, \ldots, g_{64})$, $G_2=(g_{65}, \ldots, g_{128})$, $G_3=(g_{129}, \ldots, g_{192})$, etc., vector $H=(H_1, H_2, \ldots, H_{64})$ where $H_1=(h_1, \ldots, h_{64})$, $H_2=(h_{65}, \ldots, h_{128})$, $H_3=(h_{129}, \ldots, h_{192})$, etc., vector $I=(I_1, I_2, \ldots, I_{64})$ where $I_1=(i_1, \ldots, i_{64})$, $I_2=(i_{65}, \ldots, i_{128})$, $I_3=(i_{129}, \ldots, i_{192})$, etc., and vector $J=(J_1, J_2, \ldots, J_{64})$ where $J_1=(j_1, \ldots, j_{64})$, $J_2=(j_{65}, \ldots, j_{128})$, $J_3=(j_{129}, \ldots, j_{192})$, etc. As such, the input data 299 that is divided and may form data input associated with each processing tile. For example, data 201A, 202A, 203A, 204A, . . . , 264A, are formed for processing by their respective processing tiles 201, . . . , 264.

It is appreciated that data 201A may comprise the first 64 elements from each image. In other words, data $201A=(A_1, B_1, C_1, D_1, \ldots, J_1)$, which is transmitted to processing tile 201 for processing. Data 202A may comprise the second set of 64 elements from each image, i.e., data $202A=(A_2, B_2, C_2, D_2, \ldots, J_2)$, which is transmitted to processing tile 202 for processing. It is appreciated that data 203A is the third set of 64 elements and is formed similar to above and transmitted to the third processing tile 203. It is appreciated that other data inputs are similarly formed and transmitted to their respective processing tiles, i.e., data 204A is formed and transmitted to processing tile 204, . . . , and data 264A is formed and transmitted to processing tile 264.

Accordingly, the first 64 elements of the 10 images are processed by tile 201, while the second 64 elements of the 10 images are processed by tile 202, while the third 64 elements of the 10 images are processed by tile 203, and while other portions of the images are processed by other processing tiles simultaneously. In other words, the processing tile 201 processes data 201A concurrently as the processing tile 202 processing data 202A concurrently as the processing tile 203 processing data 203A so and so forth concurrently as the processing tile 264 processing data 264A.

It is appreciated that the input data 299 is divided based on the architecture of the ML hardware 100 and its capabilities, e.g., ability to process 64 elements with depth of 10 simultaneously, as well as the size of the data being received. As such, the input data 299 may have been divided differently for a different ML hardware architecture with different capabilities.

Once each processing tile receives its respective data for processing, the SoftMax operation may be performed. First each processing tile performs an operation to find a maximum value for a vector associated with each image. For example, each processing tile may perform an ArgMax operation, TopK operation, etc., on each vector associated with each image. For example, the processing tile 201 performs operations to find the maximum value (say $a_{11}$) for entries within $A_1$, maximum value (say $b_{11}$) for entries within $B_1$, maximum value (say $c_{11}$) for entries within $C_1$, maximum value (say $d_{11}$) for entries within $D_1$, maximum value (say $e_{11}$) for entries within $E_1$, maximum value (say $f_{11}$) for entries within $F_1$, maximum value (say $g_{11}$) for entries within $G_1$, maximum value (say $h_{11}$) for entries within $H_1$, maximum value (say $i_{11}$) for entries within $I_1$, and maximum value (say $j_{11}$) for entries within $J_1$. The processing tile 201 therefore may form a vector with 10 elements, each element representing the maximum value of the data portion of its respective image. For example, the processing tile 201 may form vector ($a_{11}$, $b_{11}$, $c_{11}$, $d_{11}$, $e_{11}$, $f_{11}$, $g_{11}$, $h_{11}$, $i_{11}$, $j_{11}$). Simultaneously, other processing tiles, i.e., processing tiles 202-264, find the maximum values for their respective input data similar to processing tile 201. Accordingly, each processing tile in this nonlimiting example finds 10 maximum values, one for each portion of the image that is received. For example, processing tile 202 forms vector ($a_{21}$, $b_{21}$, $c_{21}$, $d_{21}$, $e_{21}$, $f_{21}$, $g_{21}$, $h_{21}$, $i_{21}$, $j_{21}$) where $a_{21}$ is the maximum value within $A_2$, $b_{21}$ is the maximum value within $B_2$, $c_{21}$ is the maximum value within $C_2$, $d_{21}$ is the maximum value within $D_2$, $e_{21}$ is the maximum value within $E_2$, $f_{21}$ is the maximum value within $F_2$, $g_{21}$ is the maximum value within $G_2$, $h_{21}$ is the maximum value within $H_2$, $i_{21}$ is the maximum value within $I_2$, and $j_{21}$ is the maximum value within $J_2$. Similarly, processing tiles 203-264 form their respective vectors for the maximum values, one for each portion of the image that is received. It is appreciated that operations to find the maximum values, as described above, occurs simultaneously between processing tiles 201-264, thereby improving the processing speed.

It is appreciated that since data associated with one image is scattered over multiple processing tiles (in this example 64 processing tiles), the maximum values found are local maximum values and not global. In order to find the global maximum value for each image, the local maximums that have been found by each processing tile is communicated to other processing tiles in order for each processing tile to find its global maximum value for each image. In other words, the processing tiles 201-264 may exchange their maximum values with other processing tiles such that each processing tile can find the global maximum for each image via, e.g., an all2all operation among the processing tiles. For example, processing tile 201 may send the vector ($a_{11}$, $b_{11}$, $c_{11}$, $d_{11}$, $e_{11}$, $f_{11}$, $g_{11}$, $h_{11}$, $i_{11}$, $j_{11}$) to other processing tiles while the processing tile 202 may send the vector ($a_{21}$, $b_{21}$, $c_{21}$, $d_{21}$, $e_{21}$, $f_{21}$, $g_{21}$, $h_{21}$, $i_{21}$, $j_{21}$) to other processing tiles, etc. Accordingly, each processing tile can independently process and find its global maximum for each image. Alternatively, the maximum values may be transmitted to one processing tile for processing and the result may be communicated to processing tiles 201-264.

Accordingly, the maximum value for vector A may be found to be $a_{max}$, for vector B may be found to be $b_{max}$, for vector C may be found to be $c_{max}$, for vector D may be found to be $d_{max}$, for vector E may be found to be $e_{max}$, for vector F may be found to be $f_{max}$, for vector G may be found to be $g_{max}$, for vector H may be found to be $h_{max}$, for vector I may be found to be $i_{max}$, and for vector J may be found to be $j_{max}$.

Once the global maximums for each image is found, then each processing tile performs an elementwise subtraction of its maximum value. For example, processing tile 201 may subtract $a_{max}$ from elements within $A_1$ while it may subtract $b_{max}$ from elements within $B_1$, etc. For example, ($a_1-a_{max}$), ($a_2-a_{max}$), . . . , ($a_{64}-a_{max}$), ($b_1-b_{max}$), ($b_2-b_{max}$), . . . , ($b_{64}-b_{max}$), ($c_1-c_{max}$), ($c_2-c_{max}$), . . . , ($c_{64}-c_{max}$), ($d_1-d_{max}$), ($d_2-d_{max}$), . . . , ($d_{64}-d_{max}$), ($e_1-e_{max}$), ($e_2-e_{max}$), . . . , ($e_{64}-e_{max}$), ($f_1-f_{max}$), ($f_2-f_{max}$), . . . , ($f_{64}-f_{max}$), ($g_1-g_{max}$), ($g_2-g_{max}$), . . . , ($g_{64}-g_{max}$), ($h_1-h_{max}$), ($h_2-h_{max}$), . . . , ($h_{64}-h_{max}$), ($i_1-i_{max}$), ($i_2-i_{max}$), . . . , ($i_{64}-i_{max}$), ($j_1-j_{max}$), ($j_2-j_{max}$), . . . , ($j_{64}-j_{max}$). Similarly, other processing tiles 202-264 subtract the maximum values from each element. For example, processing tile 202 may subtract $a_{max}$ from elements within $A_2$ while it may subtract $b_{max}$ from elements within $B_2$, etc., processing tile 203 may subtract $a_{max}$ from elements within $A_3$ while it may subtract $b_{max}$ from elements within $B_3$, etc. As such, subtraction of the maximum values occurs simultaneously between processing tiles 201-264 in an elementwise fashion (i.e., the respective global maximum of each image is subtracted from the element of the vector).

Once the subtraction of the global maximums, as described above, is complete, the processing tiles 201-264 perform an exponential operation on each element (i.e., forming a value that is between 0-1 inclusive) to form an exponential element. For example, processing tile 201 may perform $\exp(a_1-a_{max})$, $\exp(a_2-a_{max})$, . . . , $\exp(a_{64}-a_{max})$, $\exp(b_1-b_{max})$, $\exp(b_2-b_{max})$, . . . , $\exp(b_{64}-b_{max})$, $\exp(c_1-c_{max})$, $\exp(c_2-c_{max})$, . . . , $\exp(c_{64}-c_{max})$, $\exp(d_1-d_{max})$, $\exp(d_2-d_{max})$, . . . , $\exp(d_{64}-d_{max})$, $\exp(e_1-e_{max})$, $\exp(e_2-e_{max})$, . . . , $\exp(e_{64}-e_{max})$, $\exp(f_1-f_{max})$, $\exp(f_2-f_{max})$, . . . , $\exp(f_{64}-f_{max})$, $\exp(g_1-g_{max})$, $\exp(g_2-g_{max})$, . . . , $\exp(g_{64}-g_{max})$, $\exp(h_1-h_{max})$, $\exp(h_2-h_{max})$, . . . , $\exp(h_{64}-h_{max})$, $\exp(i_1-i_{max})$, $\exp(i_2-i_{max})$, . . . , $\exp(i_{64}-i_{max})$, $\exp(j_1-j_{max})$, $\exp(j_2-j_{max})$, . . . , $\exp(j_{64}-j_{max})$. It is appreciated that each processing tile may also perform a summation for each vector to form a partial sum of an image. For example, the processing tile 201 may form ten partial sums, one for each image. In some embodiments, a separate register may be used for storing the partial sum value. It is appreciated that accumulation of the exponential values in the separate register makes the partial sum available without a need to perform an additional summation later. The partial sum for $A_1$ may be represented below:

$$\text{Partial Sum for } A1 = \sum_{z=1}^{64} e^{(az-amax)}.$$

Similarly, partial sums for $B_1$, $C_1$, $D_1$, $E_1$, $F_1$, $G_1$, $H_1$, and $I_1$ are represented below:

$$\text{Partial Sum for } B1 = \sum_{z=1}^{64} e^{(bz-bmax)},$$

$$\text{Partial Sum for } C1 = \sum_{z=1}^{64} e^{(cz-cmax)},$$

$$\text{Partial Sum for } D1 = \sum_{z=1}^{64} e^{(dz-dmax)},$$

$$\text{Partial Sum for } E1 = \sum_{z=1}^{64} e^{(ez-emax)},$$

$$\text{Partial Sum for } F1 = \sum_{z=1}^{64} e^{(fz-fmax)},$$

$$\text{Partial Sum for } G1 = \sum_{z=1}^{64} e^{(gz-gmax)},$$

$$\text{Partial Sum for } H1 = \sum_{z=1}^{64} e^{(hz-hmax)},$$

$$\text{Partial Sum for } I1 = \sum_{z=1}^{64} e^{(iz-imax)},$$

$$\text{Partial Sum for } J1 = \sum_{z=1}^{64} e^{(jz-jmax)}.$$

It is appreciated that other processing tiles may similarly form their respective partial sums for each image. In some embodiments, the partial sums that are created by each processing tile is transmitted to other processing tiles such that a complete sum value for each image can be formed via, e.g., an all2all operation among the processing tiles. For example, the complete sum for vector A associated with the first image may be formed as shown below:

$$\text{Global Sum for } A = \sum_{z=1}^{64} \text{Partial Sum for } Az.$$

Similarly, complete sum for vectors B, C, D, E, F, G, H, I, and J associated with second through tenth image can be formed and shown below:

$$\text{Global Sum for } B = \sum_{z=1}^{64} \text{Partial Sum for } Bz,$$

$$\text{Global Sum for } C = \sum_{z=1}^{64} \text{Partial Sum for } Cz,$$

$$\text{Global Sum for } D = \sum_{z=1}^{64} \text{Partial Sum for } Dz,$$

$$\text{Global Sum for } E = \sum_{z=1}^{64} \text{Partial Sum for } Ez,$$

$$\text{Global Sum for } F = \sum_{z=1}^{64} \text{Partial Sum for } Fz,$$

$$\text{Global Sum for } G = \sum_{z=1}^{64} \text{Partial Sum for } Gz,$$

$$\text{Global Sum for } H = \sum_{z=1}^{64} \text{Partial Sum for } Hz,$$

$$\text{Global Sum for } I = \sum_{z=1}^{64} \text{Partial Sum for } Iz,$$

$$\text{Global Sum for } J = \sum_{z=1}^{64} \text{Partial Sum for } Jz.$$

It is appreciated that in some embodiments, instead of sending the partial sums to every processing tile, the partial sums may be transmitted to one processing tile to calculate a global sum, as described above. The global sum associated with each image may then be transmitted to each processing tile.

It is appreciated that once the global sum for each image is formed, each processing tile may compute 1/global sum for each image. In other words, each processing tile, e.g., processing tiles 201-264, each compute 1/global sum for each image for vectors A, B, C, . . . , J to form a scaled value. For example, 1/Global Sum for A, 1/Global Sum for B, 1/Global Sum for C, . . . , 1/Global Sum for J are formed by each processing tile.

Once the scaled value is formed, each processing tile may perform an elementwise operation by calculating the multiplication of the scaled value by each exponential element. For example, processing tile 201 may multiply each exponential element for vector A, e.g., $\exp(a_1-a_{max})$, $\exp(a_2-a_{max})$, . . . , $\exp(a_{64}-a_{max})$, by 1/Global Sum for A, multiply each exponential element for vector B, e.g., $\exp(b_1-b_{max})$, $\exp(b_2-b_{max})$, . . . , $\exp(b_{64}-b_{max})$, by 1/Global Sum for B, etc. Similarly other processing tiles perform a multiplication of the scaled values in an elementwise fashion. For example, the processing tile 202 may multiply each exponential element for vector A, e.g., $\exp(a_{65}-a_{max})$, $\exp(a_{66}-a_{max})$, . . . , $\exp(a_{128}-a_{max})$ by 1/Global Sum for A, multiply each exponential element for vector B, e.g., $\exp(b_{65}-b_{max})$, $\exp(b_{66}-b_{max})$, . . . , $\exp(b_{128}-b_{max})$, by 1/Global Sum for B, etc. Other processing tiles also perform a similar calculation. It is appreciated that the processing tiles may perform the calculation simultaneously, thereby improving the processing speed.

Accordingly, the processing tiles 201-264 perform a Soft-Max operation on the elements of the input data 299. It is appreciated that leveraging the architecture of the ML hardware, as described above, enables data to be processed (e.g., SoftMax operation) in a much faster fashion in comparison to the sequential processing of a single processing element, thereby improving the processing speed. Leveraging multiple processing tiles addresses inadequacies associated with data movement between local memory, e.g., SRAM, and external memory such as DDR because a large data set is broken down to smaller data sets, which can be processed by each processing tile locally without a need to access the external memory once the data is stored locally. Moreover, it is appreciated that intelligently exchanging local data to derive the global data also reduce latencies associated with unnecessarily sharing data.

It is appreciated that while the embodiments are described with respect to a SoftMax operation for illustrative purposes and should not be construed as limiting the scope of the embodiments. For example, any operation may be performed by the ML hardware leveraging its parallel processing capabilities. As one example, large data may be received by the ML hardware. The large data may be divided into smaller portions and each portion may be sent to one processing tile among a plurality of processing tiles for processing. Each processing tile performs a series of operations to calculate local values associated with each processing tile. The local values may be exchanged among the plurality of processing tiles to calculate global value(s). The global value(s) may be used by each processing tile to perform additional operations on its respective received data. The process may be repeated until the final results are computed.

Figure 3:
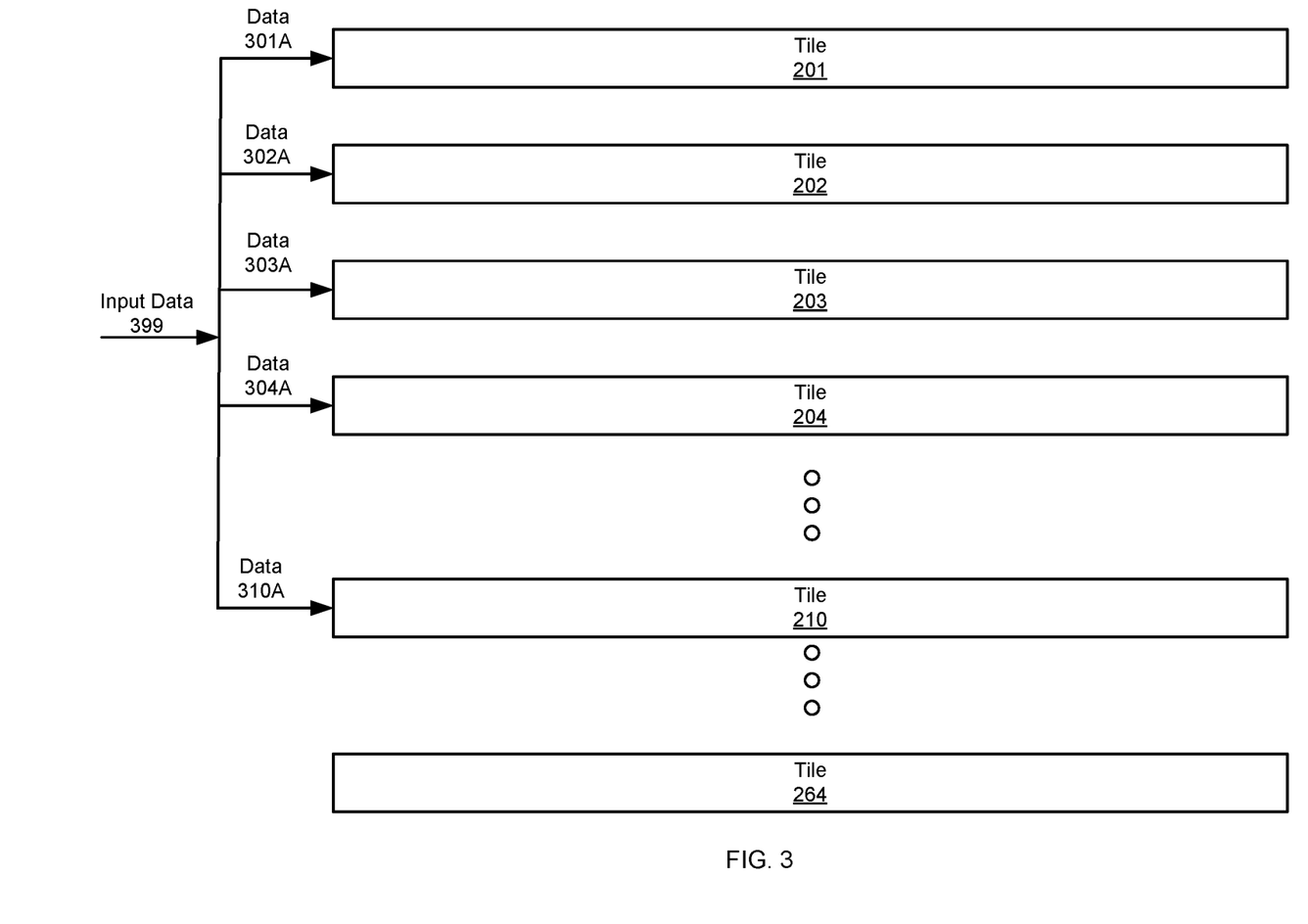
FIG. 3 depicts an ML hardware performing a SoftMax operation according to another aspect of the present embodiments.

Another example of implementing a SoftMax on an ML hardware is described in FIG. 3 for illustrative purposes. In this example, multiple SoftMax operations are performed on a set of individual vectors, e.g., images. FIG. 3 is similar to that of FIG. 2. In this nonliming example, the input data 399 is presumed to be (25,10). The input data 399 may be represented as a data matrix as shown below:

$$\text{Input Data} = \begin{bmatrix} a1 & \cdots & j1 \\ \vdots & \ddots & \vdots \\ a25 & \cdots & j25 \end{bmatrix}.$$

Accordingly, unlike in FIG. 2, all 25 elements of a given vector may be processed by the same processing tile because each processing tile may be capable of processing 64 elements and up to 10 vectors, as described above. In other words, knowledge of the ML hardware 100 and its capabilities and the data size can be used to determine that there is no need to divide each vector to be processed by different processing tiles. In this example, vector $A=(a_1, \ldots, a_{25})$ may be processed by processing tile 201, vector $B=(b_1, \ldots, b_{25})$ may be processed by processing tile 202, vector $C=(c_1, \ldots, c_{25})$ may be processed by processing tile 203, vector $D=(d_1, \ldots, d_{25})$ may be processed by processing tile 204, vector $E=(e_1, \ldots, e_{25})$ may be processed by processing tile 205, vector $F=(f_1, \ldots, f_{25})$ may be processed by processing tile 206, vector $G=(g_1, \ldots, g_{25})$ may be processed by processing tile 207, vector $H=(h_1, \ldots, h_{25})$ may be processed by processing tile 208, vector $I=(i_1, \ldots, i_{125})$ may be processed by processing tile 209, and vector $J=(j_1, \ldots, j_{25})$ may be processed by processing tile 210. It is appreciated that in this example other processing tiles 211-264 may be free to process other data.

Similar to FIG. 2, the maximum value of each vector is determined by each processing tile 201-210. The maximum value may be used to perform an elementwise subtraction operation, similar to that of FIG. 2. Elementwise exponential operation may be performed by each processing tile. It is appreciated that due to the size of data being processed, in this example the partial sums that are formed are the global sums and there is no need to communicate the global sums to other processing tiles because each SoftMax operation is being performed by only one processing tile and not distributed among multiple processing tiles. The global sums are then used to calculate the scaled values, as described above and subsequently to perform the multiplication on each exponential element, as described above. It is appreciated that FIG. 3 is different from that of FIG. 2 in that there is not a need for local data to be communicated to other processing tiles to form any global values because each processing tile alone is capable of performing the SoftMax operation itself in an efficient manner.

Figure 4:
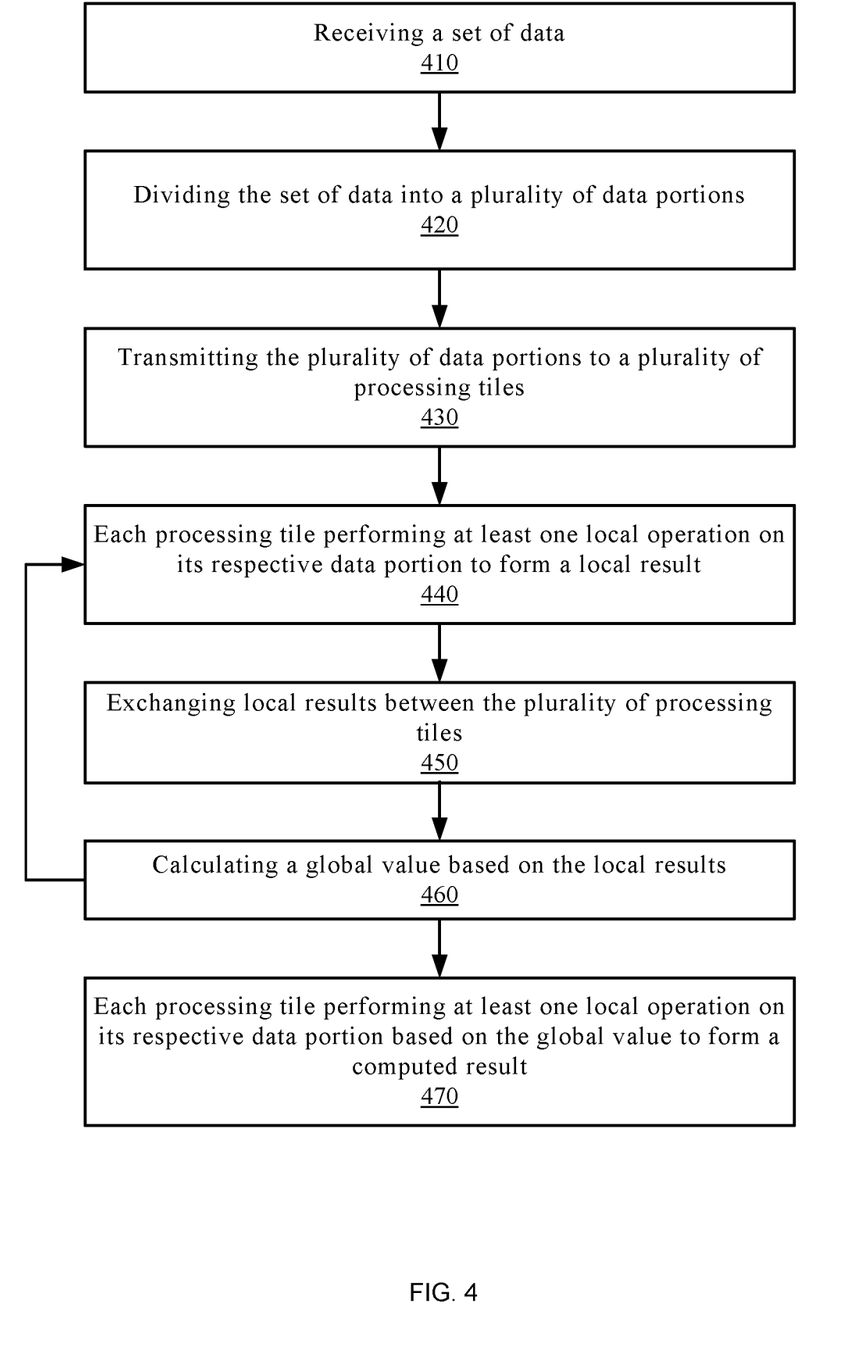
FIG. 4 depicts a flow diagram of parallel processing of a SoftMax operation according to one aspect of the present embodiments.

FIG. 4 depicts a flow diagram of parallel processing of a SoftMax operation according to one aspect of the present embodiments. At step 410, a set of data is received. For example, data 299 or data 399 as described above is received. At step 420, the set of data is divided into a plurality of data portions, as described in FIGS. 2 and 3 above. For example, the ML hardware architecture and the amount of data being sent is used to decide on how the set of data should be divided and which data portion needs to be sent to which processing tile, as described above. At step 430, the plurality of data portions are transmitted to a plurality of processing tiles. For example, as described in FIG. 2, data 201A is transmitted to the processing tile 201 while data 204A is transmitted to the processing tile 204, etc. At step 440, each processing tile of the plurality of processing tiles performs at least one local operation on its respective data portion to form a local result, as described in FIG. 2. For example, processing tile 201 may find a local maxima of $A_1$ entries, local maxima of $B_1$ entries, etc. Other processing tiles may similarly perform an operation to find a local maxima of their respective data, as described in FIG. 2. At step 450, the local results that are formed by each processing tile of the plurality of processing tiles is exchanged with other processing tiles. At step 460, a global value is calculated based on the local results, by each processing tile, as described in FIG. 2 above. For example, processing tile 201 may use local maximum of $A_1$ from processing tile 201 as well as local maximum of $A_2$-$A_{64}$ from other processing tiles to form its global value, e.g., maximum global value. Similarly, processing tile 201 may use local maximum of $B_1$ from processing tile 201 as well as local maximum of $B_2$-$B_{64}$ from other processing tiles to form its global value. It is appreciated that other processing tiles may also calculate their respective global values, as described above. It is appreciated that steps 440-460 may be repeated as many times as needed to calculate/perform other local/global operations. For example, once a global maximum for vectors A, B, C, . . . , J are determined, each processing tile may perform an elementwise subtraction, e.g., a maximum value of vector subtracted from each element of vector A, etc., as described above in FIG. 2. Similarly, exponential operations on the subtraction result may be calculated, partial sum of exponential results may be formed, global sum may be calculated based on the partial sum of exponential results, and scaled values (i.e., inverted global sum) may be formed, as described in FIG. 2. At step 470, each processing tile of the plurality of processing tiles performs at least one local operation on its respective data portion based on the global value to form a computed result, as described in FIG. 2. For example, each processing tile may perform a multiplication of the scaled values by exponential elements, in an elementwise fashion.

It is appreciated that the processing tiles may be within an inference engine of an ML hardware and may perform local and/or global operations simultaneously, as described above.

Figure 5:
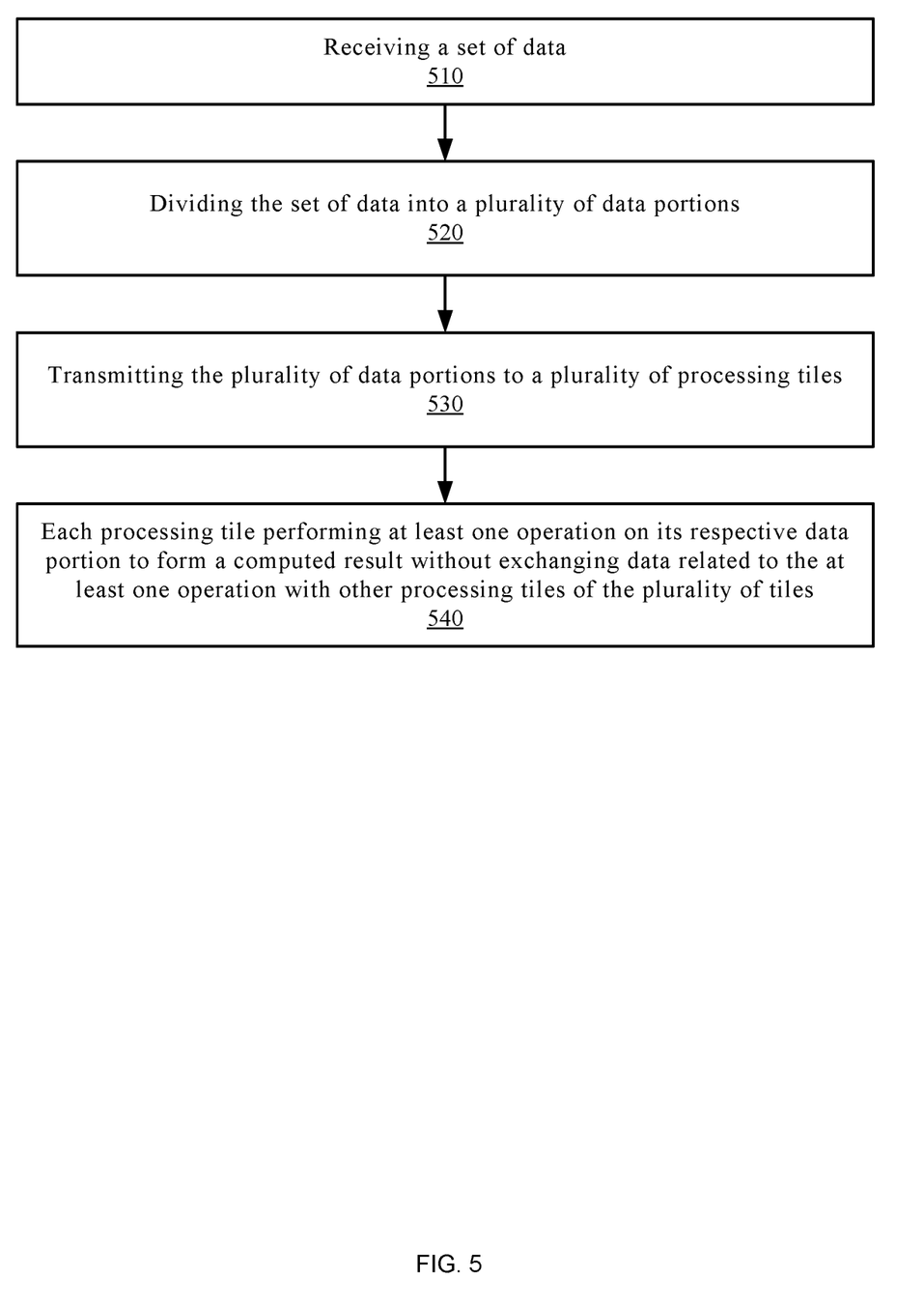
FIG. 5 depicts another flow diagram of parallel processing of a SoftMax operation according to one aspect of the present embodiments.

FIG. 5 depicts another flow diagram of parallel processing of a SoftMax operation according to one aspect of the present embodiments. At step 510, a set of data is received. The set of data is divided into a plurality of data portions, at step 520, as described in FIG. 3. At step 530, the plurality of data portions is transmitted to a plurality of processing tiles, as described in FIG. 3. It is appreciated that each data portion of the plurality of data portions is associated with a processing tile of a plurality of tiles. At step 540, each processing tile of the plurality of tiles performs at least one operation on its respective data portion to form a final result without exchanging data related to the at least one operation with other processing tiles of the plurality of tiles, as described in FIG. 3. It is appreciated that since data is divided in such a manner that all data can be processed by a single processing tile and there are no dependencies between the data being processed by different processing tiles, there is no need to exchange their respective data to form the computed result.

It is appreciated that various methodologies may be utilized in finding the maximum value of a vector. Below is a description of finding the maximum value according to some embodiments that were described in the U.S. patent application Ser. No. 17/511,111, that was filed on Oct. 26, 2021 and which is incorporated herein in its entirety.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A computer implemented method, comprising:
receiving a set of data;
dividing the set of data into a plurality of data portions;
transmitting the plurality of data portions to a plurality of processing tiles, wherein each data portion of the plurality of data portions is associated with a processing tile of a plurality of tiles;
performing by each processing tile of the plurality of tiles at least one local operation on its respective data portion to form a local maxima;
exchanging local maximas between the plurality of processing tiles;
calculating a global maximum value based on the local maximas;
performing by each processing tile of the plurality of tiles a subtraction operation of the global maximum value from each data input its respective data portion to form a subtraction result;
performing by each processing tile of the plurality of tiles an exponential operation on the subtraction result to form exponential results;
forming a sum of the exponential results from the plurality of tiles; and
inverting the sum to form a scaled value.

2. The computer implemented method of claim 1, wherein the at least one local operation that forms the final result is an elementwise multiplication of the scaled value and the exponential results.

3. The computer implemented method of claim 1, wherein the plurality of processing tiles are within an inference engine of a machine learning hardware.

4. The computer implemented method of claim 1, wherein the plurality of processing tiles operate simultaneously when performing the at least one local operation.

5. The computer implemented method of claim 1, wherein the plurality of processing tiles operate simultaneously when calculating the global maximum value.

6. The computer implemented method of claim 1, wherein the plurality of processing tiles operate simultaneously when performing the at least one local operation on its respective data portion based on the global maximum value to form the final result.

7. A computer implemented method, comprising:
receiving a set of data;
dividing the set of data into a plurality of data portions;
transmitting the plurality of data portions to a plurality of processing tiles, wherein each data portion of the plurality of data portions is associated with a processing tile of a plurality of tiles;
each processing tile of the plurality of tiles performing at least one operation on its respective data portion to form a computed result without exchanging data related to the at least one operation with other processing tiles of the plurality of tiles, wherein the at least one operation is finding a maximum value associated with the respective data portion;
performing by each processing tile of the plurality of tiles a subtraction operation of the maximum value from each data input its respective data portion to form a subtraction result;
performing an exponential operation on the subtraction result to form exponential results on each processing tile of the plurality of tiles;
forming a sum of the exponential results on each processing tile of the plurality of tiles; and
inverting the sum of exponential results to form a scaled value on each processing tile of the plurality of tiles.

8. The computer implemented method of claim 7, wherein the at least one operation that forms the final result is an elementwise multiplication of the scaled value and the exponential results.

9. The computer implemented method of claim 7, wherein the plurality of processing tiles are within an inference engine of a machine learning hardware.

10. The computer implemented method of claim 7, wherein the plurality of processing tiles operate simultaneously when performing the at least one operation.

11. A system comprising:
a means for receiving a set of data;
a means for dividing the set of data into a plurality of data portions;
a means for transmitting the plurality of data portions to a plurality of processing tiles, wherein each data portion of the plurality of data portions is associated with a processing tile of a plurality of tiles;
a means for performing at least one local operation by each processing tile of the plurality of tiles on its respective data portion to form a local maxima;
a means for exchanging local maximas between the plurality of processing tiles;
a means for calculating a global maximum value based on the local maximas;
a means for performing by each processing tile of the plurality of tiles a subtraction operation of the global maximum value from each data input its respective data portion to form a subtraction result;
a means for performing by each processing tile of the plurality of tiles an exponential operation on the subtraction result to form exponential results;
a means for forming a sum of the exponential results from the plurality of tiles; and
a means for inverting the sum to form a scaled value.

12. A system, comprising:
a plurality of processing tiles within an inference engine, wherein a set of received data is divided into a plurality of data portions, and wherein the plurality of data portions is transmitted to the plurality of processing tiles, wherein each data portion of the plurality of data portions is associated with a processing tile of a plurality of tiles, and wherein each processing tile of the plurality of processing tiles is configured to:
perform at least one local operation on its respective data portion to form a local maxima;
exchange local maximas with processing tiles within the plurality of processing tiles;
calculate a global maximum value based on the local maximas;
perform a subtraction operation of the global maximum value from each data input its respective data portion to form a subtraction result;
performing an exponential operation on the subtraction result to form exponential results;
form a sum of the exponential results from the plurality of tiles; and
invert the sum to form a scaled value.

13. A system, comprising:
a first processing tile and a first on-chip memory (OCM); and
a second processing tile and a second OCM;
wherein a set of received data is divided into a first data portion and a second data portion, wherein the first data portion is transmitted to the first processing tile and the first OCM and wherein the second data portion is transmitted to the second processing and the second OCM, wherein the first processing tile is configured to perform a local operation on the first data portion to form a first local maxima, and wherein the second processing tile is configured to perform a local operation on the second data portion to form a second local maxima, and wherein the first processing tile and the second processing tile are configured to exchange their respective local maximas with one another and to calculate a global maximum value based on the first and the second local maximas, and wherein the first processing tile and the second processing tile are configured to perform a subtraction operation of the global maximum value from each data input its respective data portion to form a subtraction result, and wherein the first processing tile and the second processing tile are configured to perform an exponential operation on the subtraction result to form exponential results, and wherein the first processing tile and the second processing tile are configured to form a sum of the exponential results from the plurality of tiles; and and wherein the first processing tile and the second processing tile are configured to invert the sum to form a scaled value.

14. A computer implemented method, comprising:

receiving a set of data;

dividing the set of data into a plurality of data portions;

transmitting the plurality of data portions to a plurality of processing tiles, wherein each data portion of the plurality of data portions is associated with a processing tile of a plurality of tiles;

performing by each processing tile of the plurality of tiles at least one local operation on its respective data portion to form a local maxima;

exchanging local maximas between the plurality of processing tiles;

calculating a global maximum value based on the local maximas;

negating the global maximum value to form a negative global maximum value;

performing by each processing tile of the plurality of tiles an addition operation of the negative global maximum value and each data input its respective data portion to form an addition result;

performing by each processing tile of the plurality of tiles an exponential operation on the addition result to form exponential results;

forming a sum of the exponential results from the plurality of tiles; and inverting the sum to form a scaled value.

15. A computer implemented method, comprising:

receiving a set of data;

dividing the set of data into a plurality of data portions;

transmitting the plurality of data portions to a plurality of processing tiles, wherein each data portion of the plurality of data portions is associated with a processing tile of a plurality of tiles;

performing by each processing tile of the plurality of tiles at least one local operation on its respective data portion to form a local maxima;

exchanging local maximas between the plurality of processing tiles;

calculating a global maximum value based on the local maximas;

performing by each processing tile of the plurality of tiles a subtraction operation of the global maximum value from each data input its respective data portion to form a subtraction result;

performing by each processing tile of the plurality of tiles an exponential operation on the subtraction result to form exponential results;

forming a sum of the exponential results from the plurality of tiles; and divide each exponential result of the exponential results by the sum of the exponential results.

* * * * *